(12) United States Patent
Tupman et al.

(10) Patent No.: US 8,633,679 B2
(45) Date of Patent: Jan. 21, 2014

(54) METHOD AND SYSTEM FOR OPERATING A PORTABLE ELECTRONIC DEVICE IN A POWER-LIMITED MANNER

(75) Inventors: David John Tupman, San Francisco, CA (US); Steven Bollinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 13/331,128

(22) Filed: Dec. 20, 2011

(65) Prior Publication Data

US 2012/0088556 A1    Apr. 12, 2012

Related U.S. Application Data

(63) Continuation of application No. 12/768,958, filed on Apr. 28, 2010, now Pat. No. 8,106,630, which is a continuation of application No. 12/400,670, filed on Mar. 9, 2009, now Pat. No. 7,746,032, which is a continuation of application No. 11/009,675, filed on Dec. 10, 2004, now Pat. No. 7,541,776.

(51) Int. Cl.
*H02J 7/00* (2006.01)
*H02J 7/04* (2006.01)

(52) U.S. Cl.
USPC ........... 320/134; 320/103; 320/128; 320/132; 320/162

(58) Field of Classification Search
USPC ................ 320/103, 128, 134–136, 162–163; 307/43–66
See application file for complete search history.

(56) References Cited

U.S. PATENT DOCUMENTS

| | | |
|---|---|---|
| 4,673,861 A | 6/1987 | Dubovsky et al. |
| 4,965,738 A | 10/1990 | Bauer et al. |
| 5,103,156 A | 4/1992 | Jones et al. |
| 5,150,031 A | 9/1992 | James et al. |
| 5,371,456 A | 12/1994 | Brainard |
| 5,402,055 A | 3/1995 | Nguyen |
| 5,471,128 A | 11/1995 | Patino et al. |
| 5,498,950 A | 3/1996 | Ouwerkerk |

(Continued)

FOREIGN PATENT DOCUMENTS

| | | |
|---|---|---|
| JP | 2001-69165 A | 3/2001 |
| WO | WO 99/26330 | 5/1999 |
| WO | WO 00/39907 | 7/2000 |
| WO | WO 03/073688 | 9/2003 |

OTHER PUBLICATIONS

"LTC4055—USB Power Controller and Li-Ion Linear Charger," Linear Technology, 2004.

(Continued)

*Primary Examiner* — Richard V Muralidar
(74) *Attorney, Agent, or Firm* — Womble Carlyle Sandridge & Rice LLP

(57) ABSTRACT

Improved techniques to manage operation of a portable electronic device having a substantially depleted battery when power is available from an external, power-limited source are disclosed. In one embodiment of the invention, the substantially depleted battery can be initially charged while a power-intensive operation is delayed. Once the battery has adequate charge to assist the external, power-limited source in powering the portable electronic device, the power-intensive operation can be performed. In this manner, power consumption of a portable electronic device can be managed so that reliable operation is achieved without exceeding limits on power being drawn from an external, power-limited source.

15 Claims, 7 Drawing Sheets

(56) References Cited

U.S. PATENT DOCUMENTS

| | | | |
|---|---|---|---|
| 5,514,945 A | 5/1996 | Jones | |
| 5,602,455 A | 2/1997 | Stephens et al. | |
| 5,648,712 A | 7/1997 | Hahn | |
| 5,754,027 A | 5/1998 | Oglesbee et al. | |
| 5,845,217 A | 12/1998 | Lindell et al. | |
| 5,955,869 A | 9/1999 | Rathmann | |
| 6,007,372 A | 12/1999 | Wood | |
| 6,025,695 A | 2/2000 | Friel et al. | |
| 6,125,455 A | 9/2000 | Yeo | |
| 6,130,518 A | 10/2000 | Gabehart et al. | |
| 6,152,778 A | 11/2000 | Dalton | |
| 6,169,387 B1 | 1/2001 | Kaib | |
| 6,178,514 B1 | 1/2001 | Wood | |
| 6,184,652 B1 | 2/2001 | Yang | |
| 6,184,655 B1 | 2/2001 | Malackowski | |
| 6,204,637 B1 | 3/2001 | Rengan | |
| 6,211,581 B1 | 4/2001 | Farrant | |
| 6,211,649 B1 | 4/2001 | Matsuda | |
| 6,252,380 B1 | 6/2001 | Koenck | |
| 6,261,109 B1 | 7/2001 | Liu et al. | |
| 6,271,605 B1 | 8/2001 | Carkner et al. | |
| 6,283,789 B1 | 9/2001 | Tsai | |
| 6,316,916 B2 | 11/2001 | Bohne | |
| 6,353,894 B1 | 3/2002 | Pione | |
| 6,357,011 B2 | 3/2002 | Gilbert | |
| 6,392,414 B2 | 5/2002 | Bertness | |
| 6,489,751 B2 | 12/2002 | Small et al. | |
| 6,522,118 B1 | 2/2003 | Barcelo et al. | |
| 6,526,516 B1 | 2/2003 | Ishikawa et al. | |
| 6,614,232 B1 | 9/2003 | Mukai | |
| 6,747,859 B2 | 6/2004 | Walbeck et al. | |
| 6,799,226 B1 | 9/2004 | Robbin et al. | |
| 6,946,817 B2 * | 9/2005 | Fischer et al. | 320/132 |
| 6,969,970 B2 | 11/2005 | Dias et al. | |
| 6,995,963 B2 | 2/2006 | Fadell et al. | |
| 7,054,981 B2 | 5/2006 | Fadell et al. | |
| 7,541,776 B2 * | 6/2009 | Tupman et al. | 320/134 |
| 7,746,032 B2 * | 6/2010 | Tupman et al. | 320/132 |
| 8,106,630 B2 * | 1/2012 | Tupman et al. | 320/132 |
| 2001/0003205 A1 | 6/2001 | Gilbert | |
| 2001/0005641 A1 | 6/2001 | Matsumoto et al. | |
| 2001/0006884 A1 | 7/2001 | Matsumoto | |
| 2002/0156949 A1 | 10/2002 | Kubo et al. | |
| 2003/0076301 A1 | 4/2003 | Tsuk et al. | |
| 2003/0095096 A1 | 5/2003 | Robbin et al. | |
| 2003/0110403 A1 | 6/2003 | Crutchfield et al. | |
| 2004/0117518 A1 | 6/2004 | Fadell et al. | |
| 2004/0224638 A1 | 11/2004 | Fadell et al. | |
| 2004/0225804 A1 | 11/2004 | Leete | |

OTHER PUBLICATIONS

"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.

"Cables to Go", download Oct. 16, 2001, http://www.cablestogo.com/product.asp?cat%5Fid=601&sku=27028.

"ExpressBus™ FU010 User Guide Packing Checklist", Belkin Components, 2007.

"FireWire Connector", downloaded Oct. 16, 2001, wysiwyg://76/http://developer.apple.com/...es/Macintosh_CPUs-G3/ibook/ibook-27.html.

"FireWire", downloaded Oct. 16, 2001, wysiwyg://42/http://developer.apple.com/hardware/FireWire.

"How to Connect Your Computer, PC Hardware", downloaded Oct. 16, 2001, http:///www.scar.utoronto.ca/~ccweb/faculty/connect-howto.html.

"IEEE 1394/USB Comparison", downloaded Oct. 16, 2001, www.genitech.com.au/LIBRARY/TechSupport/infobits/firewire_vs_usb.htm.

"Making USB Work", downloaded Oct. 16, 2001, PC Magazine: PC Tech (Making USB Work) wysiwyg://55/http://www.zdnet.com/pcmag/pctech/content/18/04/tu1804.001.html.

"PMC FW2 IEEE1394 FireWire Controller", downloaded Oct. 16, 2001, http://www.bvmltd.co.uk/PMCfw2ds.html.

"Why FireWire is Hot!Hot!Hot!", downloaded Oct. 16, 2001, "Impact.FireWire.SideBar", http://www.vxm.com/21R.35.html.

Charles Severance, "FireWire Finally Comes Home," Michigan State University, pp. 117-118, Nov. 1998.

Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.

Ian Fried, "New FireWire to blaze faster trail", downloaded Oct. 16, 2001, CNET News.com, http://news.cnet.com/news/0/1006-200-6021210.html.

Michael D. Johas Teener, "Understanding FireWire: The IEEE 1394 Standards and Specifications", downloaded Oct. 16, 2001, wysiwyg://9/http://www.chipcenter.com/networking/ieee1394/main.html.

International Search Report in PCT application PCT/US05/024906 dated Mar. 15, 2006.

"Introduction to Public Key Cryptography," Oct. 9, 1998, printed from http://developer.netscape.com/docs/manuals/security/pkin/contents.htm on Oct. 6, 2004.

Brentrup, "Public Key Cryptography Demystified," Campus Technology, printed from http://www.campus-technology.com/article.asp?id=7626 on Oct. 6, 2004.

Whittle, "Public Key Authentication Framework: Tutorial," First Principles Consulting, Jun. 2, 1996.

Belkin iPod Voice Recorder, Product Specification Sheet, printed Jun. 16, 2004.

Networking Tech Note, "1394 Standards and Specifications," 3 pgs., Oct. 16, 2001.

Menezes et al., "Handbook of Applied Cryptography," Identification and Entity Authentication, pp. 385-424, 1997.

U.S. Appl. No. 10/125,893, filed Apr. 18, 2002 entitled Power Adapters for Powering and/or Charging Peripheral Devices.

* cited by examiner

METHOD AND SYSTEM FOR OPERATING A PORTABLE ELECTRONIC DEVICE IN A POWER-LIMITED MANNER

CROSS-REFERENCE TO RELATED APPLICATIONS

This application is a continuation of U.S. application Ser. No. 12/768,958, filed Apr. 28, 2010, now U.S. Pat. No. 8,106,630, issued Jan. 31, 2012, which is a continuation of U.S. application Ser. No. 12/400,670, filed Mar. 9, 2009, now U.S. Pat. No. 7,746,032, issued Jun. 29, 2010, which is a continuation of U.S. application Ser. No. 11/009,675 filed Dec. 10, 2004, now U.S. Pat. No. 7,541,776, issued Jun. 2, 2009, all of which are hereby incorporated by reference herein for all purposes.

This application is related to: (i) U.S. patent application Ser. No. 10/961,776, filed Oct. 8, 2004, and entitled "METHOD AND SYSTEM FOR DISCOVERING A POWER SOURCE ON A PERIPHERAL BUS," and subsequently converted to U.S. Provisional Patent Application No. 60/608,959 on Feb. 15, 2005, and which is hereby incorporated by reference herein for all purposes; and (ii) U.S. patent application Ser. No. 10/961,571, filed Oct. 8, 2004, and entitled "METHOD AND SYSTEM FOR TRANSFERRING DATA WITH RESPECT TO A PORTABLE ELECTRONIC DEVICE," and which is hereby incorporated by reference herein for all purposes.

BACKGROUND OF THE INVENTION

1. Field of the Invention

The present invention relates to portable electronic devices and, more particularly, to power-limited operation of portable electronic devices, such as portable media players.

2. Description of the Related Art

A media player is normally portable media device that is battery-powered. A media player typically operates to store and play media items for the benefit of its user. One exemplary media player is the iPod® offered by Apple Inc. of Cupertino, Calif. which has the capability to store and play many different media items (i.e., songs) as well as synchronize its media items with a host computer via a bus connection.

When the media player is connected to a host computer by a bus connection over a cable, power can also be supplied to the media player by way of the cable. For example, when the bus connection is a FIREWIRE connection or a Universal Serial Bus (USB) connection, power is available to be supplied to the media player over the bus connection. However, the available power from the bus connection is typically limited by the associated bus standard. For example, USB specification limits the amount of power drawn from a USB bus, normally, the power limit in terms of current is 100 mA. The available power from the bus connection can be used by the media player to perform various operations. Recently, such power from the bus connection has been used to charge the battery utilized by the media player. However, when the media player is consuming significant power due to its performance of operations, the available power from the bus connection can be exceeded by the media player's performance of operations. In such case, the battery is not able to be charged and can operate in a negative charge environment. In the negative charge environment, the battery's charge is being drained because the power consumed by the media player while performing various operations exceeds the power available over the bus connection. This is particularly problematic when the battery charge level is low. If the battery is not already completely discharged, a negative charge environment might be tolerated for some unknown period of time. However, if the media player's operations continue, the battery will eventually be fully drained in which case the media player would fail.

Thus, there is a need for improved techniques to manage power consumption on a media player so that reliable operation can be achieved.

SUMMARY OF THE INVENTION

Broadly speaking, the invention relates to improved techniques to manage operation of a portable electronic device having a substantially depleted battery when power is available from an external, power-limited source. In one embodiment of the invention, the substantially depleted battery can be initially charged while a power-intensive operation is delayed. Once the battery has adequate charge to assist the external, power-limited source in powering the portable electronic device, the power-intensive operation can be performed. In this manner, power consumption of a portable electronic device can be managed so that reliable operation is achieved without exceeding limits on power being drawn from an external, power-limited source. As an example, the external, power-limited source can be a peripheral bus having data and power lines.

The invention pertains to portable electronic devices that are powered by an internal battery and/or a peripheral bus connection with a host device. As examples, the portable electronic devices can be portable data storage devices (e.g., portable disk drives) or, more particularly, portable media devices. A portable media device, such as a portable media player, is typically capable of storing and playing media items as well as receiving (transferring) media items over a peripheral bus connection with a host device (e.g., personal computer).

The invention can be implemented in numerous ways, including as a method, system, device, apparatus, or computer readable medium. Several embodiments of the invention are discussed below.

As a method for starting up a mobile device having a battery, one embodiment of the invention includes at least the acts of: examining a battery level of the battery; determining whether the battery level is substantially depleted; determining whether an external, power-limited power source is electrically coupled to the mobile device; and deferring start-up of the mobile device while charging the battery via power provided to the mobile device from the external, power-limited power source when it is determined that the battery level is substantially depleted and it is determined that the external, power-limited power source is electrically coupled to the mobile device.

As a method for starting up a mobile computing device having a battery, another embodiment of the invention includes at least the acts of: examining a battery level of the battery; determining whether the battery level exceeds a first threshold level; determining whether power is available from a host computer via a power-limited peripheral bus electrically coupled to the mobile computing device; and initiating charging of the battery using at least a portion of the power that is available via the power-limited peripheral bus when it is determined that the battery level does not exceed the first threshold level and it is determined that power is available from the power-limited peripheral bus.

As a media device, one embodiment of the invention includes at least: a media store for storing media items; a communication interface for interfacing with a host device via a cable that provides media data and power to the media device when the cable is connected between the media device and the host device; a battery for providing power to the media device; and a battery monitor that monitors a battery attribute of the battery, wherein start-up of the media device is deferred based on the battery attribute of the battery as monitored by the battery monitor.

As a computer readable medium for performing a power-intensive operation by a mobile device having a battery, one embodiment of the invention includes at least: computer program code for examining a battery level of the battery; computer program code for determining whether the battery level is substantially depleted; computer program code for determining whether a power-limited power source is electrically coupled to the mobile device; and computer program code for deferring performance of the power-intensive operation by the mobile device while charging the battery via power provided to the mobile device from the power-limited power source when it is determined that the battery level is substantially depleted and it is determined that the power-limited power source is electrically coupled to the mobile device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques to manage operation of a portable electronic device having a substantially depleted battery when power is available from an external, power-limited source. In one embodiment of the invention, the substantially depleted battery can be initially charged while a power-intensive operation is delayed. Once the battery has adequate charge to assist the external, power-limited source in powering the portable electronic device, the power-intensive operation can be performed. In this manner, power consumption of a portable electronic device can be managed so that reliable operation is achieved without exceeding limits on power being drawn from an external, power-limited source. As an example, the external, power-limited source can be a peripheral bus having data and power lines.

The invention pertains to portable electronic devices that are powered by an internal battery and/or a peripheral bus connection with a host device. As examples, the portable electronic devices can be portable data storage devices (e.g., portable disk drives) or, more particularly, portable media devices. A portable media device, such as a portable media player, is typically capable of storing and playing media items as well as receiving (transferring) media items over a peripheral bus connection with a host device (e.g., personal computer). Although the invention is further described below with reference to media devices, it should be understood that the invention is applicable to other types of portable electronic device besides media devices.

Embodiments of the invention are discussed below with reference to FIGS. 1-5. However, those skilled in the art will readily appreciate that the detailed description given herein with respect to these figures is for explanatory purposes as the invention extends beyond these limited embodiments.

Figure 1:
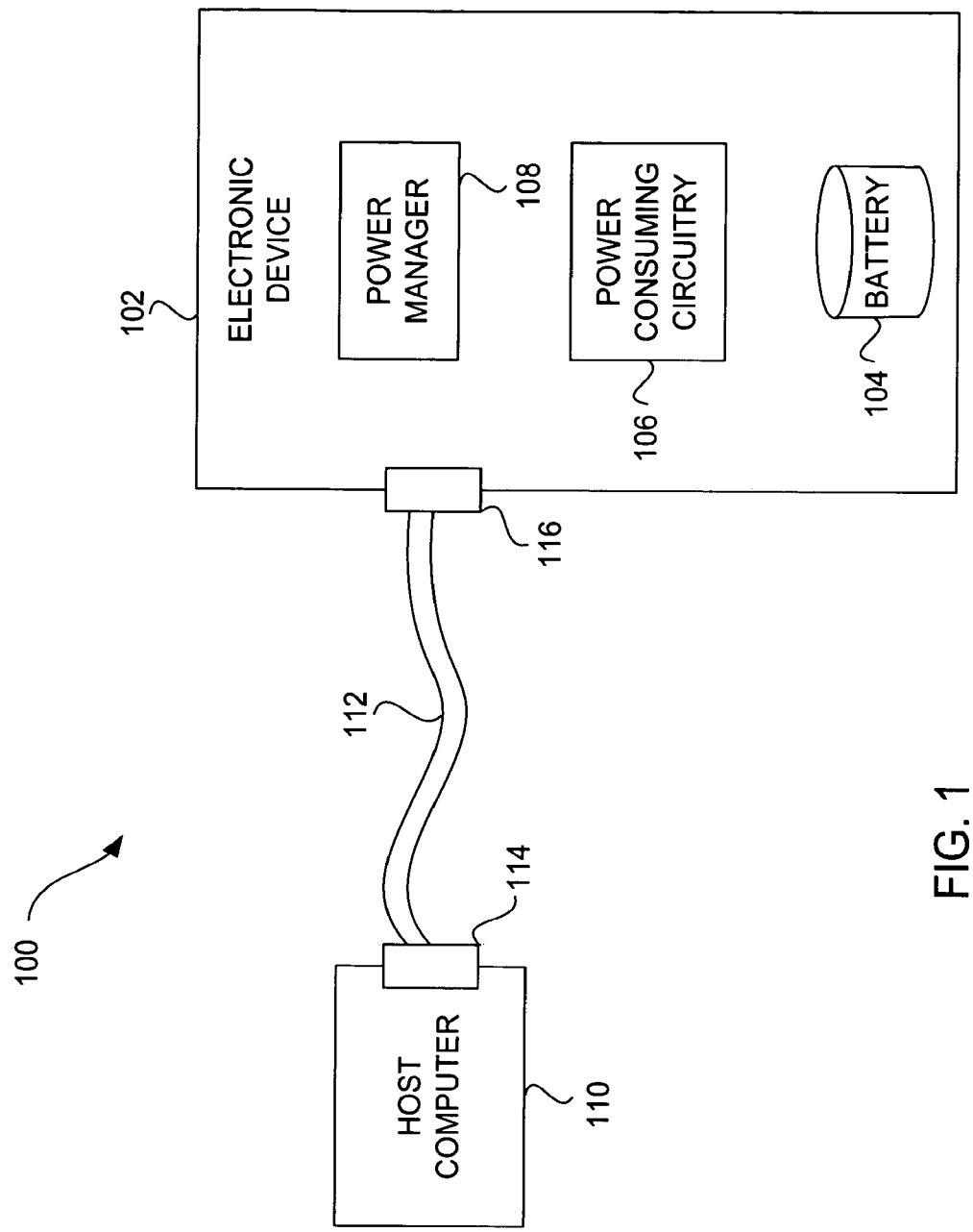
FIG. 1 is a block diagram of a power management system according to one embodiment of the invention.

FIG. 1 is a block diagram of a power management system 100 according to one embodiment of the invention. The power management system 100 includes an electronic device 102. The electronic device 102 includes, among other things, a battery 104, power consuming circuitry 106, and a power manager 108. The battery 104 provides power for operating the electronic device 102. For example, the power supplied by the battery 104 can be used to power the power consuming circuitry 106 and the power manager 108. In addition, the electronic device 102 can be coupled to a host computer 110 by a peripheral cable 112. The host computer 110 has a peripheral connector 114, and the electronic device 102 has a peripheral connector 116. The peripheral connector 114 can receive a counterpart connector at one end of a peripheral cable 112, and the peripheral connector 116 can receive a counterpart connector at another end of the peripheral cable 112. The peripheral cable 112 is used to provide data and DC power from the host computer 110 to the electronic device 102. Hence, when the peripheral cable 112 is coupled between the host computer 110 and the electronic device 102, the electronic device 102 can receive DC power and/or data over the peripheral cable 112. In one embodiment, a peripheral bus is provided over the peripheral cable 112. As one example, the peripheral bus can be a Universal Serial Bus (USB) bus, and the peripheral connectors 114 and 116 can be USB connectors. In another example, the peripheral bus can be a FIREWIRE™ bus, and the peripheral connectors 114 and 116 can be FIREWIRE™ connectors.

The DC power supplied to the electronic device 102 by the peripheral cable 112 can be consumed by various circuitry within the electronic device 102. However, the peripheral bus is designed to provide only a certain, limited amount of power to peripheral devices, such as the electronic device 102. Hence, proper design of the electronic device 102 would dictate that the electronic device 102 respect that only a certain, limited amount of power is made available by the peripheral bus. Unfortunately, however, the amount of DC power available from the peripheral bus tends to be insufficient to operate the electronic device 102 in many situations. Hence, to prevent the electronic device 102 from over-consuming the limited amount of available power from the peripheral bus, the electronic device 102 includes the power manager 108. The power manager 108 can operate the power consuming circuitry 106 within the electronic device 102 such that the available power from the peripheral bus is not over-consumed. As an example, the power manager 108 can disable, limit or sequence usage of various circuits of the power consuming circuitry 106 such that the power being consumed via the peripheral bus is normally not more than the certain, limited amount of power made available over the peripheral bus. This allows the electronic device 102 to be in compliance with any industry standard that governs the amount of power that can be drawn from the peripheral bus. For example, the peripheral bus can be a USB bus and the electronic device 102 can operate in compliance with the power utilization limitations specified by the USB specification. The battery 104 provided within the electronic device 102 can provide power when the peripheral cable 112 is not connected, or can provide supplemental power (should it be needed) when the peripheral cable 112 is connected. Given that the power available from the peripheral bus is limited, the supplemental power available from the battery 114 can be important and, therefore, should be controlled or limited.

Figure 2:
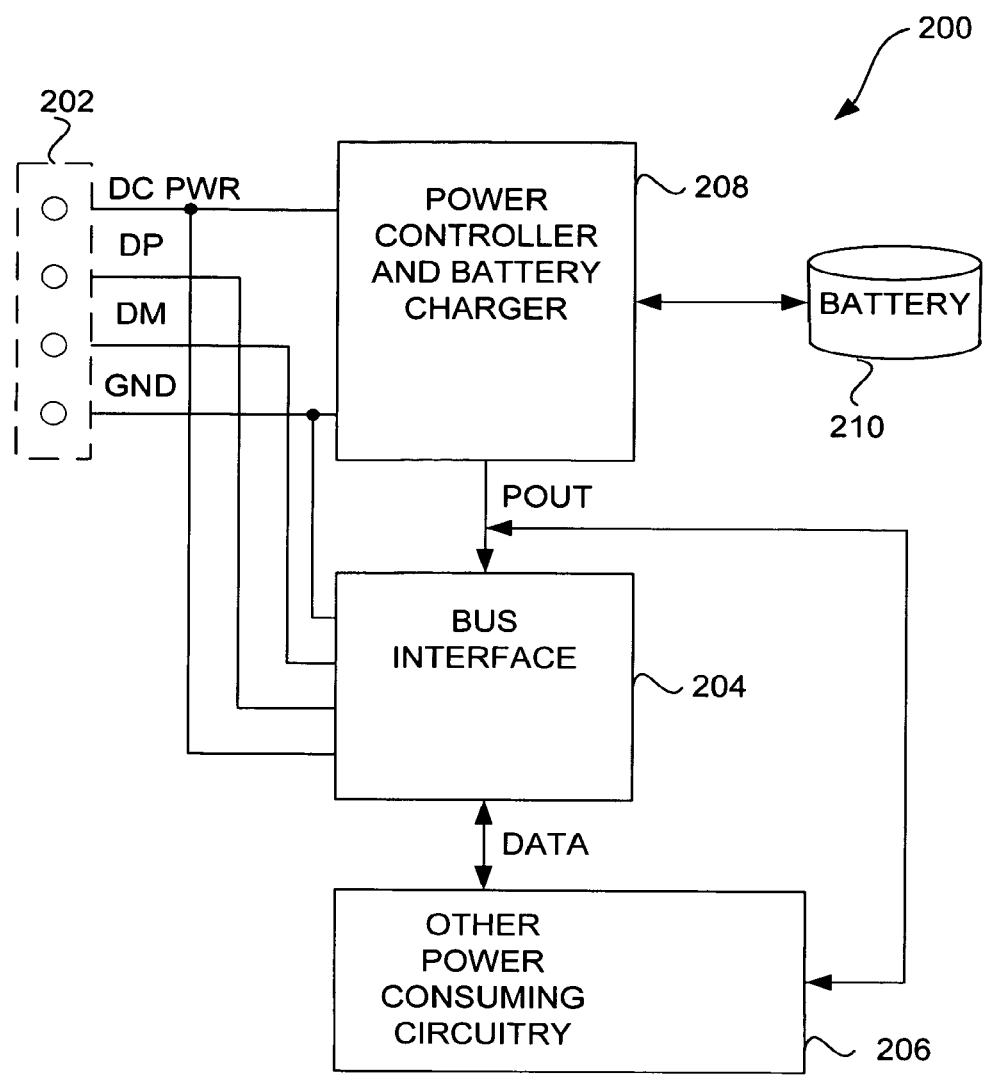
FIG. 2 is a block diagram of an electronic device according to one embodiment of the invention.

FIG. 2 is a block diagram of an electronic device 200 according to one embodiment of the invention. The electronic device 200 can, for example, represent the electronic device 102 illustrated in FIG. 1.

The electronic device 200 couples to or includes a peripheral connector 202. The peripheral connector 202 is coupled to a DC power (DC PWR) line, a data DP line, a data DM line, and a ground (GND) line. These lines are supplied to a bus interface 204. The bus interface 204 enables the electronic device 200 to receive power and/or participate in data transmissions and receptions over a peripheral bus. The data transmissions or receptions can supply data to or receive data from other power consuming circuitry 206 provided within the electronic device 200. Since the invention is primarily concerned with power utilization at the electronic device 200, the discussion below is primarily directed to power management at the electronic device 200.

The electronic device 200 also includes a power controller and battery charger 208 and a battery 210. The power controller and battery charger 208 couples to the DC power (DC PWR) line and the ground (GND) line of the peripheral connector 202. The power controller and battery charger 208 operates to receive DC power from a peripheral cable (i.e., peripheral bus) via the peripheral connector 202. The power controller and battery charger 208 also can monitor a battery level for the battery 210. Still further, the power controller and battery charger 208 can operate to charge the battery 210 using some or all of the DC power provided by the peripheral cable. The power controller and battery charger 208 is typically an integrated circuit, such as a standard integrated circuit (IC) or a custom integrated circuit (e.g., ASIC). One suitable integrated circuit suitable for use as the power controller and battery charger 208 is LTC4055 from Linear Technology Corporation in Milpitas, Calif.

In general, the power controller and battery charger 208 operates to control the operational activity of the electronic device 200 so that its power draw (e.g., current draw) via the peripheral bus does not exceed the power available according to the industry standard. In this regard, the power controller and battery charger 208 may cause the bus interface 204 or the other power consuming circuitry 206 to defer operations, sequence operations, or avoid operations so that the power consumption of the electronic device 200 is managed. In one embodiment, start-up of the electronic device 200 is deemed to consume more power than the available amount of power from the peripheral bus. Hence, in such an embodiment, the power controller and battery charger 208 ensures that the battery 210 is at least charged to a sufficient level such that during start-up, the battery 210 can adequately assist the peripheral bus in providing power to the electronic device 200 so that start-up can be performed.

Typically, the electronic device 200 is a battery-powered device, where the battery is rechargeable battery. At least a portion of the power available at the peripheral bus can be used to charge the rechargeable battery of the electronic device. Hence, the charging operation may affect the amount of power available for other circuitry within the electronic device 200. Furthermore, to the extent that the battery is adequately charged, the battery may offer additional power for consumption by the electronic device 200 in the event that the available power offered via the peripheral bus is exceeded by operational activity of the electronic device 200. Examples of the other power consuming circuitry 206 will vary widely depending upon implementation. Nevertheless, some examples of other power consuming circuitry 206 include a disk drive, a battery charge circuit, a memory device (e.g., RAM, ROM), a battery monitor, and a display. For example, during start-up of the electronic device 200 a disk drive may be repeatedly accessed. In such case, since a disk drive often consumes significant amounts of power when being accessed, power consumption tends to be high (e.g., beyond that available from the peripheral bus). The high power consumption means that additional power may be needed from the battery to operate the disk drive. As such, the additional power available from the battery is an important consideration for reliable operation of the electronic device 200, particularly during start-up.

In one embodiment, start-up of the electronic device 200 is a boot-up process that initially executes computer instructions resident in random-access memory (ROM) (i.e., semiconductor memory) and subsequently accesses a disk drive to obtain other computer instructions that are then executed. Hence, in such an embodiment, the electronic device 200 can perform an initial portion of the boot-up process using power from the peripheral bus. However, before permitting a subsequent portion of the boot-up process, the power controller and battery charger 208 can ensures that the battery 210 is at least charged to a sufficient level such that the battery 210 can adequately assist the peripheral bus in providing power to complete the subsequent portion of the boot-up process.

Figure 3:
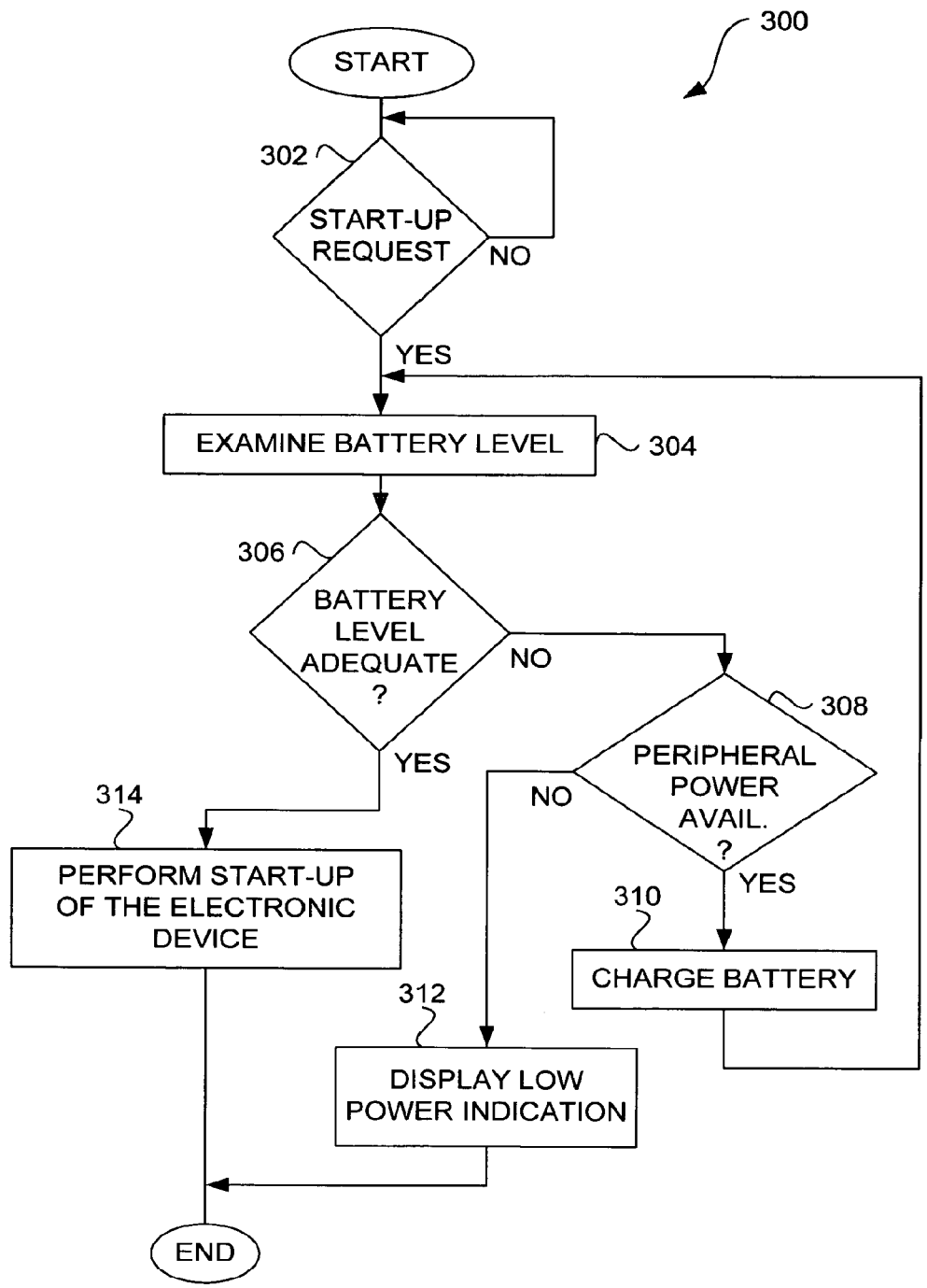
FIG. 3 is a flow diagram of a start-up process according to one embodiment of the invention.

FIG. 3 is a flow diagram of a start-up process 300 according to one embodiment of the invention. The start-up process 300 is, for example, performed by an electronic device, such as the electronic device 102 illustrated in FIG. 1 or the electronic device 200 illustrated in FIG. 2.

The start-up process 300 begins with a decision 302 that determines whether a start-up request has been made. To be activated, the electronic device is required to be started-up, e.g., booted-up, as is conventional with various types of computing devices. Typically, the start-up (or boot-up) process requires retrieving of computer program code from memory and then executing the computer program code to load an operating system as well as other utilities, programs, code libraries, etc. When the decision 302 determines that a start-up request has not been received, then the start-up process 300 can await such a request.

Once the decision 302 determines that a start-up request has been received, a battery level for the battery of the electronic device is examined 304. The battery level being examined can pertain to a charge, current, or voltage level of the battery. A decision 306 determines whether the battery level is adequate. In one embodiment, the battery level is adequate if it has sufficient available power to enable the electronic device to complete its start-up. When the decision 306 determines that the battery level is inadequate, then a decision 308 determines whether peripheral power is available. For example, peripheral power can be available from a peripheral bus, such as a USB. When the decision 308 determines that peripheral power is available, then the battery is charged 310 using the power made available by the peripheral bus. After the battery has been charged 310 for some period of time, the start-up process 300 returns to repeat the operation 304 and subsequent operations so that the battery level can be reexamined. Alternatively, when the decision 308 determines that peripheral power is not available, then a low power indication is displayed 312 on a display device associated with the electronic device. The low power indication can be represented by text, graphics (e.g., symbols) or both. The low power indication serves to inform the user of the electronic device that start-up of the electronic device cannot be performed until the electronic device couples to an external power source, namely, a peripheral bus or power adapter, so that peripheral power becomes available.

On the other hand, when the decision 306 determines that the battery level is adequate, then start-up of the electronic device can be performed 314. Consequently, start-up of the electronic device is after the battery level is determined to be adequate, which may or may not impose a delay period while the battery is charged. In the end, the start-up process 300 operates to ensure safe and reliable start-up of the electronic device.

The start up process 300 illustrated in FIG. 3 is most useful in the case where the battery level of the battery of the electronic device is substantially depleted when a start-up request is made. With the battery level being substantially depleted, the electronic device must be coupled to an external power source, such as a peripheral bus or a power adapter. Hence, when the electronic device is coupled to a peripheral bus, the electronic device can receive external power over the peripheral bus. However, given that the amount of power drawn on peripheral buses is limited and/or controlled by industry standards, the electronic device must take care to comply with these standards. If the battery level is adequate to enable the battery to itself complete a start-up of the electronic device, then the start-up can be performed without delay. However, when the battery level is not adequate to start-up the electronic device, power from the peripheral bus is utilized to initially charge the battery to a limited extent so that it stores adequate charge such that it can supplement the power available over the peripheral bus during the start-up of the electronic device.

Still further, although not illustrated in FIG. 3, between blocks 302 and 304, a decision could be made as to whether a power adapter is available to the electronic device. If a power adapter is available, then the start-up process 300 can directly perform the operation 314 so as to start-up the electronic device. On the other hand, when the power adapter is not available, the operation 304 and subsequent operations illustrated in FIG. 3 are performed so that, as needed, a degraded battery can be charged.

Figure 4A:
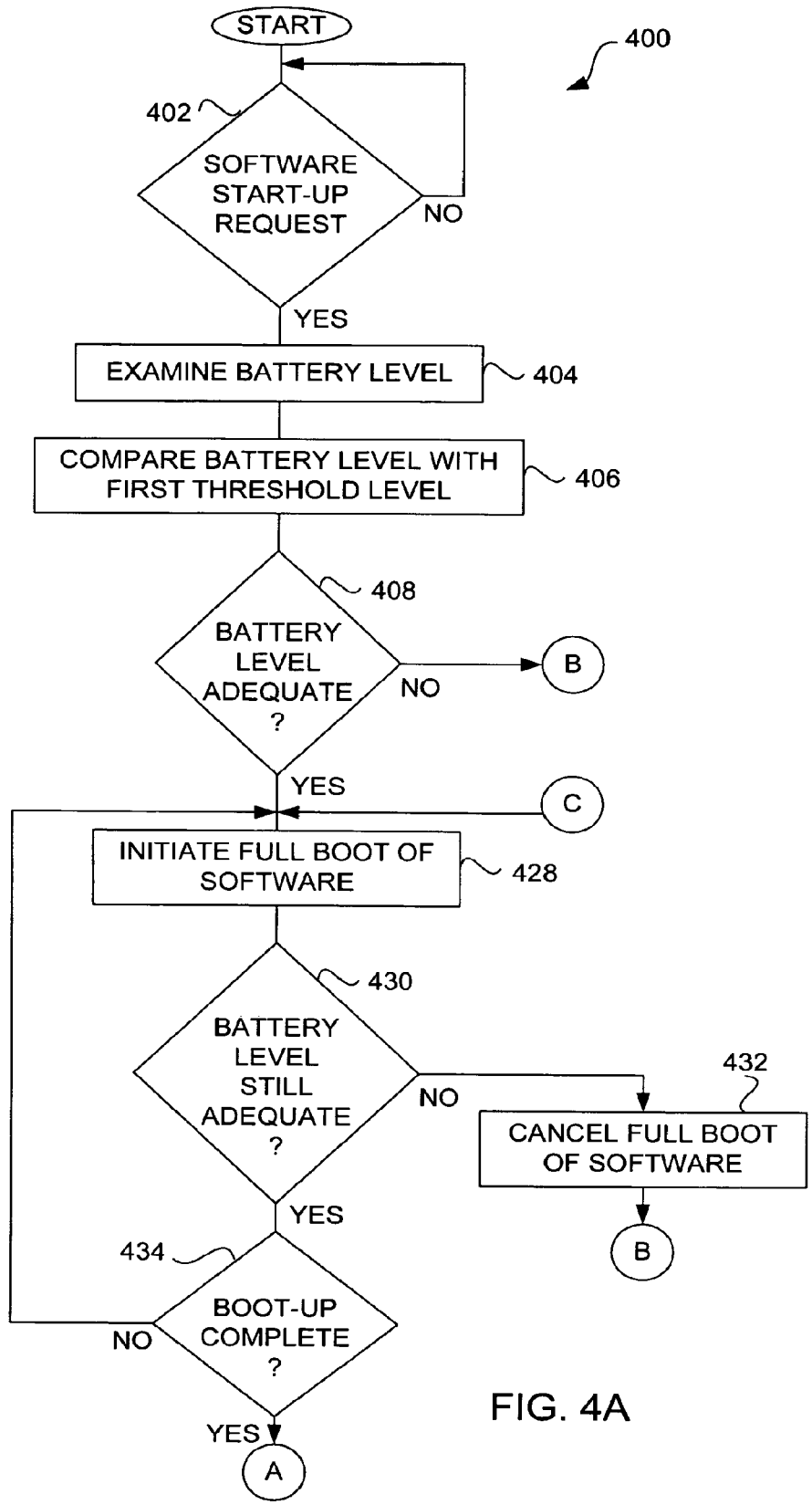
FIGS. 4A-4C are flow diagrams of a start-up process according to another embodiment of the invention.
Figure 4B:
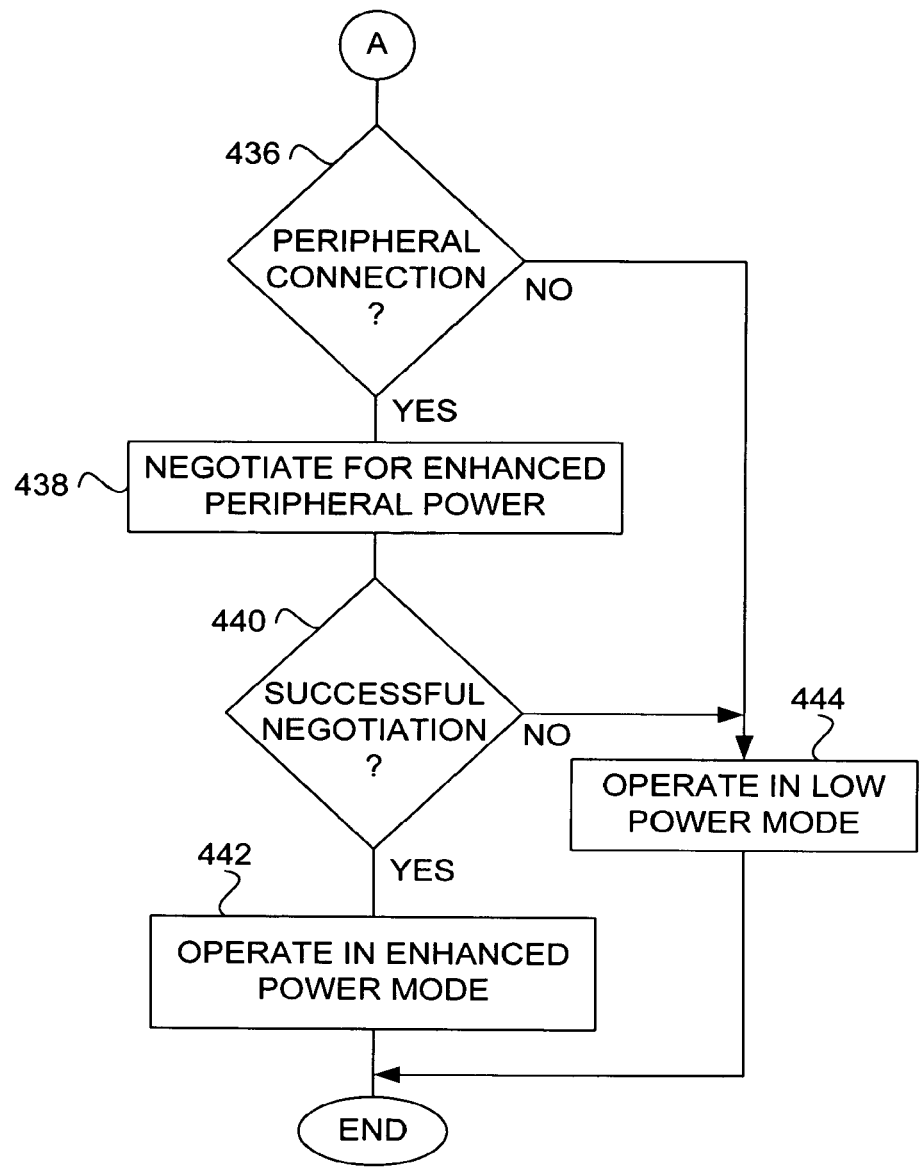
Figure 4C:
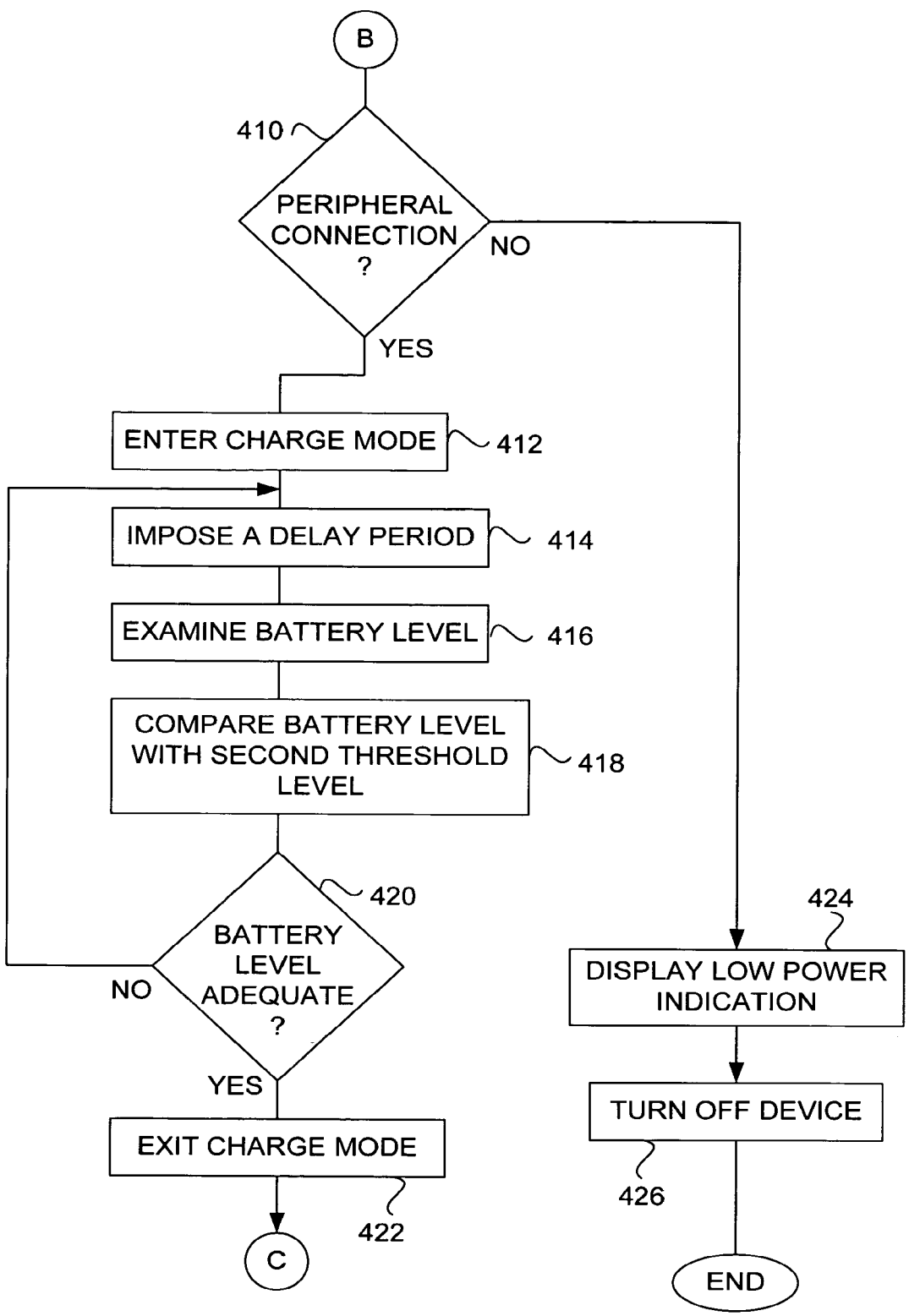

FIGS. 4A-4C are flow diagrams of a start-up process 400 according to another embodiment of the invention. The start-up process 400 is, for example, performed by an electronic device, such as the electronic device 102 illustrated in FIG. 1 or the electronic device 200 illustrated in FIG. 2.

The start-up process 400 initially determines whether a software start-up request has been issued. A software start-up request is issued when the electronic device is to be activated (i.e., booted-up). When the decision 402 determines that a software start-up request has not been issued, then the software start-up request 402 awaits such a request. Once the decision 402 determines that a software start-up request has been received, a battery level for a battery internal to the electronic device is examined 404. Then, the battery level is compared 406 with a first threshold level. A decision 408 then determines whether the battery level is adequate.

When the decision 408 determines that the battery level is inadequate, then a decision 410 determines whether a peripheral connection is present. When the decision 410 determines that a peripheral connection is present, then the electronic device enters 412 a charge mode. In the charge mode, the battery of the electronic device is charged by at least power supplied over the peripheral bus. Once the charge mode is entered 412, a delay period is imposed 414. The delay period is associated with the time period during which the battery of the electronic device is constantly charged. Thereafter, the battery level is again examined 416. Then, the battery level is compared 418 with a second threshold level. The second threshold level can be the same or different than the first threshold level. In examining the battery level, charging of the battery is known to affect the measured battery level. Hence, in one embodiment, the charging is stopped while the battery level is examined, and in another embodiment, the charging is not stopped but the second threshold level is adjusted to offset for the effects of the charging.

Following the comparison 418 of the battery level with the second threshold level, a decision 420 determines whether the battery level is adequate. When the decision 420 determines that the battery level is adequate, then the charge mode is exited 422. When the charge mode is exited, the charging of the battery stops (at least until start-up has completed). Alternatively, when the decision 420 determines that the battery level is inadequate, then the start-up process 400 remains in the charge mode so that the battery can be further charged during at least the delay period being imposed 414.

On the other hand, when the decision 410 determines that a peripheral connection is not present, then a low power indication can be displayed 424 on a display screen associated with the display device. As an example, the low power indication can be text or graphics that are used to signal to a user of the electronic device that the electronic device should be coupled to an external power source. After the low power indication has been displayed 424 for a period of time, the electronic device is then turned off 426. Here, the electronic device can be turned off because the only power available is from the battery and is inadequate to successfully perform start-up. Following the block 426, the start-up process 400 ends without having started-up the electronic device. Alternatively, in one embodiment, following the display 424 of the low power indication, a period of time can be provided for the user of the electronic device to cause connection to a power source (e.g., peripheral bus) to be made, and then proceed to enter 412 the charge mode.

Following the block 422, the start-up process 400 returns again to FIG. 4A where a full boot of the software residing on the electronic device is initiated 428. Also, when the decision 408 determines that the battery level is adequate, a full boot of the software residing on the electronic device is also initiated 428. As the boot-up is being performed, the battery level can be again examined and compared to a threshold level. A decision 430 can then determine whether the battery level is still adequate. Here, the full boot of the software has been initiated 428. Hence, the decision 430 is determining whether the battery level is still adequate while the start-up (i.e., boot-up) of the software completes. When the decision 430 determines that the battery level is still adequate, a decision 434 determines whether the boot-up has completed. When the decision 434 determines that the boot-up has not yet completed, the start-up process returns to repeat the operation 428 and subsequent operations so that boot-up can complete. Alternatively, when the decision 430 determines that the battery level is now inadequate, the full boot of the software is cancelled 432. Following the block 432, the start-up process 400 proceeds to the decision 410 and subsequent operations as illustrated in FIG. 4C so that the battery can be charged. However, it is possible that the decision 420 in this instance would require that the battery level be higher than a previous attempt to charge the battery given that the battery level became inadequate during boot-up.

In any event, when the decision 434 determines that the boot-up (or start-up) has completed, a decision 436 determines whether a peripheral connection is present. When the decision 436 determines that a peripheral connection is provided, the electronic device negotiates 438 for enhanced peripheral power. Here, the peripheral connection provides power to the electronic device via the peripheral bus. In one embodiment, the limit on the power that can be drawn from the peripheral bus is substantially limited. However, typically, the peripheral buses support greater demands of power but require that the peripheral device (i.e., electronic device) negotiate with the host computer supplying the peripheral bus to obtain additional peripheral power. For example, the USB specification places a limit on power drawn from the USB but permits a higher limit following a negotiation process.

Following the negotiation 438, a decision 440 determines whether the negotiation was successful. When the decision 440 determines that the negotiation was successful, then the electronic device is operated 442 in an enhanced power mode. While in the enhanced power mode, the battery can be further charged as needed. On the other hand, when the decision 440 determines that negotiation was not successful, or when the decision 436 determines that no peripheral connection is available, then the electronic device is operated 444 in a low power mode. In one embodiment, the presence of a low battery level together with the lack of either a peripheral connection or a power adapter connection would cause the electronic device to be shut-down if required to operate in the low power mode.

Figure 5:
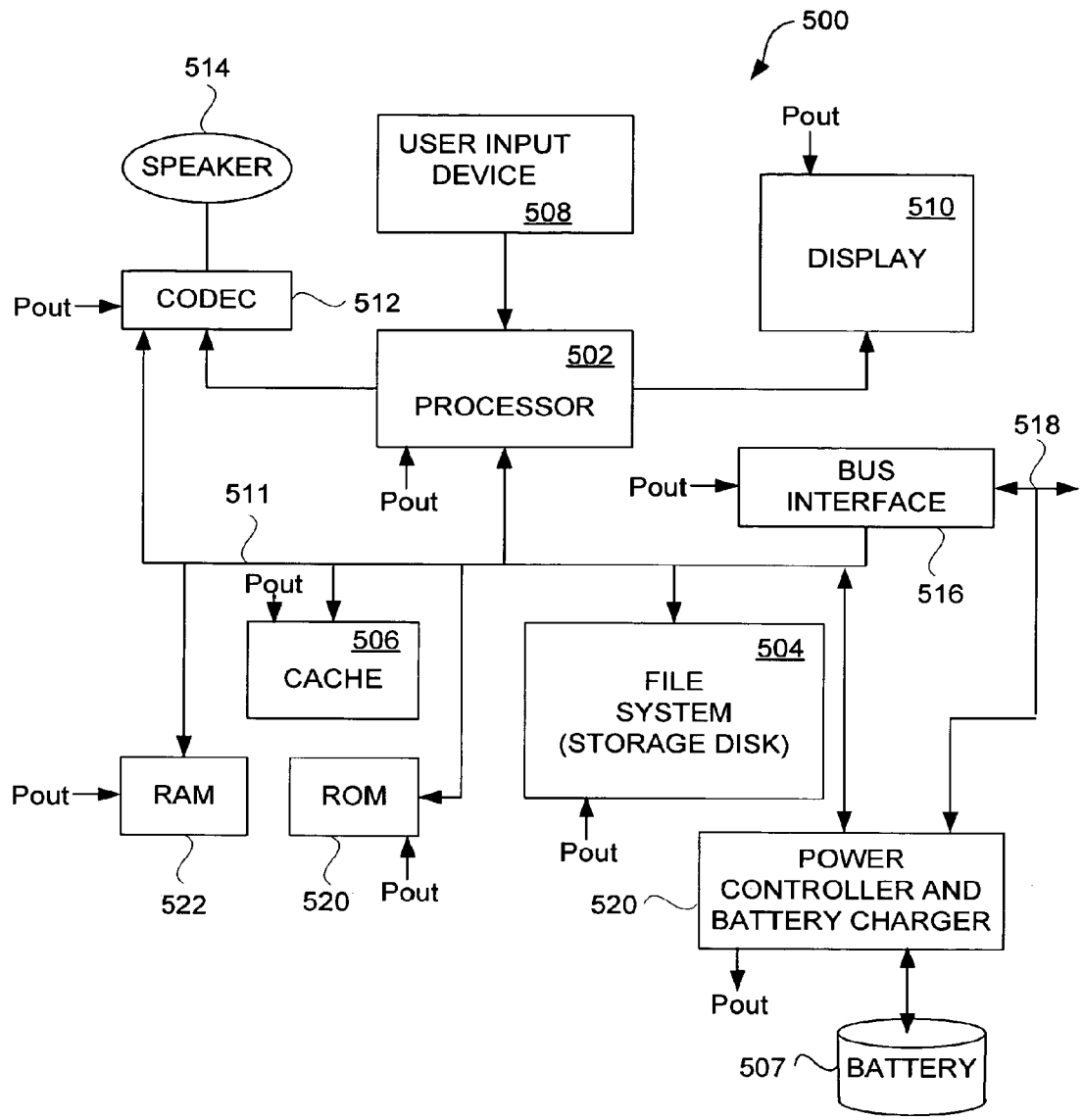
FIG. 5 is a block diagram of a media player according to one embodiment of the invention.

FIG. 5 is a block diagram of a media player 500 according to one embodiment of the invention. The media player 500 includes a processor 502 that pertains to a microprocessor or controller for controlling the overall operation of the media player 500. The media player 500 stores media data pertaining to media items in a file system 504 and a cache 506. The file system 504 is, typically, a storage disk or a plurality of disks (e.g., hard disk drives(s)). The file system 504 typically provides high capacity storage capability for the media player 500. However, since the access time to the file system 504 is relatively slow, the media player 500 can also include a cache 506. The cache 506 is, for example, Random-Access Memory (RAM) provided by semiconductor memory. The relative access time to the cache 506 is substantially shorter than for the file system 504. However, the cache 506 does not have the large storage capacity of the file system 504. Further, the file system 504, when active, consumes more power than does the cache 506. The power consumption is often a concern when the media player 500 is a portable media player that is powered by a battery 507 or peripheral bus. The media player 500 also includes a RAM 520 and a Read-Only Memory (ROM) 522. The ROM 522 can store programs, utilities or processes to be executed in a non-volatile manner. The RAM 520 provides volatile data storage, such as for the cache 506.

The media player 500 also includes a user input device 508 that allows a user of the media player 500 to interact with the media player 500. For example, the user input device 508 can take a variety of forms, such as a button, keypad, dial, etc. Still further, the media player 500 includes a display 510 (screen display) that can be controlled by the processor 502 to display information to the user. A data bus 511 can facilitate data transfer between at least the file system 504, the cache 506, the processor 502, and the CODEC 512.

In one embodiment, the media player 500 serves to store a plurality of media items (e.g., songs) in the file system 504. When a user desires to have the media player play a particular media item, a list of available media items is displayed on the display 510. Then, using the user input device 508, a user can select one of the available media items. The processor 502, upon receiving a selection of a particular media item, supplies the media data (e.g., audio file) for the particular media item to a coder/decoder (CODEC) 512. The CODEC 512 then produces analog output signals for a speaker 514. The speaker 514 can be a speaker internal to the media player 500 or external to the media player 500. For example, headphones or earphones that connect to the media player 500 would be considered an external speaker.

The media player 500 also includes a network/bus interface 516 that couples to a peripheral bus 518. The peripheral bus 518 allows the media player 500 to couple to a host computer. The peripheral bus 518 can also provide power to the media player 500. A power controller and battery charger 520 receives power from the peripheral bus 518 (if connected) and the battery 507 and outputs an output power POUT for power the power consuming circuitry of the media player 500. The power controller and battery charger 520 can also monitor battery level and charge the battery 506. The processor 502 can also communicate with the power controller and battery charger 520 so as to determine when to complete start-up, negotiate for enhanced peripheral power, etc.

The media items discussed herein are not limited to audio items (e.g., audio files or songs). For example, the media item can alternatively pertain to videos (e.g., movies) or images (e.g., photos).

The various aspects, embodiments, implementations or features of the invention can be used separately or in any combination.

The invention is preferably implemented by hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a portable electronic device can be started from a dead battery using power provided over a power-limited peripheral bus. Another advantage of the invention is that start-up of a portable electronic device can be achieved using power from a power-limited peripheral bus together with power from a battery of the portable electronic device. Another advantage of the invention is that a substantially depleted battery of a portable electronic device can be initially charged so that operation (e.g., start-up) of the portable electronic device can be thereafter achieved without exceeding limits on power to be drawn from a peripheral bus. Still another advantage of the invention is that operation (e.g., start-up) of a portable media device can be reliably performed even when a battery is substantially depleted.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of managing power in a portable electronic device, comprising:
   receiving a request to initiate a power intensive operation that consumes power from a battery in the portable electronic device;
   comparing a level of the battery in the portable electronic device to a first threshold level;
   initiating execution of the power intensive operation when the battery level is greater than the first threshold level;
   otherwise, when the portable electronic device is connected to an external power source:
      delaying execution of the power intensive operation until the battery level is greater than a second threshold level;
      charging the battery;
      measuring the battery level while charging the battery; and
      continuing to charge the battery until the measured battery level is greater than a third threshold level, the third threshold level being determined from the second threshold level by adjusting to offset for effects of charging the battery.

2. The method as recited in claim 1, further comprising:
   shutting down the portable electronic device when the battery level is not greater than the first threshold level and the portable electronic device is not connected to the external power source.

3. The method as recited in claim 1, further comprising:
   measuring the battery level while executing the power intensive operation; and
   canceling the power intensive operation when the battery level is not adequate to complete the power intensive operation.

4. The method as recited in claim 3, further comprising:
   after canceling the power intensive operation and when the portable electronic device is connected to the external power source, charging the battery from the external power source to the second threshold level and re-initiating from the beginning execution of the power intensive operation.

5. The method as recited in claim 1, further comprising:
   after completing executing the power intensive operation, operating the portable electronic device in a lower power mode when the portable electronic device is not connected to an external power source.

6. The method as recited in claim 1, further comprising:
   after completing executing the power intensive operation, negotiating for enhanced power delivery from the external power source; and
   operating the portable electronic device in an enhanced power mode when the negotiation is successful.

7. The method as recited in claim 1, wherein the portable electronic device is a portable media player having a data storage device that stores media items.

8. The method as recited in claim 1, wherein the portable electronic device is a mobile telephone.

9. A power manager system included in a portable electronic device, comprising:
   a battery monitor coupled to a battery in the portable electronic device arranged to determine a battery level of the battery;
   a battery charging circuit to charge the battery from an external power source; and
   a processor coupled to the battery monitor arranged to:
      initiate a power intensive operation when the battery monitor determines that the battery level is greater than a first threshold value,
      otherwise, when the portable electronic device is connected to an external power source:
         delay execution of the power intensive operation until the battery is charged to a level greater than a second threshold level;
         direct the battery charging circuit to charge the battery;
         direct the battery monitor to measure the battery level while the battery is charging; and
         direct the battery charging circuit to continue to charge the battery until the measured battery level is greater than a third threshold level that is determined from the second threshold level by adjusting to offset for effects of the charging.

10. The power manager system as recited in claim 9, wherein the processor is further arranged to:
    display a low power indication on a display screen associated with the portable electronic device is not greater than the first threshold level;
    wait a period of time for the portable electronic device to be connected to the external power source;
    when the portable electronic device is subsequently connected to the external power source, direct the battery charging circuit to charge the battery; and
    otherwise, turn off the portable electronic device.

11. Computer program product encoded in a non-transitory computer readable medium for managing power in a portable electronic device, the computer program product comprising:
    computer program code for receiving a request to initiate a power intensive operation that consumes power from a battery in the portable electronic device;
    computer program code for comparing a level of the battery in the portable electronic device to a first threshold level;
    computer program code for initiating execution of the power intensive operation when the battery level is greater than the first threshold level;
    otherwise, when the portable electronic device is connected to an external power source:
       computer program code for delaying execution of the power intensive operation until the battery level is greater than a second threshold level;
       computer program code for charging the battery;
       computer program code for measuring the battery level while charging the battery; and
       computer program code for continuing to charge the battery until the measured battery level is greater than a third threshold level that is determined from the second threshold level by adjusting to offset for the effects of the charging.

12. The computer program product as recited in claim 11, further comprising:
    when the portable electronic device is not connected to the external power source and the battery level is not greater than the first threshold level,
    computer code for displaying a low power indication on a display screen associated with the portable electronic device for a period of time; and
    computer code for subsequently turning off the portable electronic device.

13. The computer program product as recited in claim 11, further comprising:

when the portable electronic device is not connected to the external power source and the battery level is not greater than the first threshold level,
- computer program code for displaying a low power indication on a display screen;
- computer program code for waiting a period of time for a user of the portable electronic device to connect the portable electronic device to the external power source; and
- when the portable electronic device is connected to the external power source, computer code for proceeding to charge the battery from the external power source.

14. The computer program product as recited in claim 11, further comprising:
- computer program code for measuring the battery level while executing the power intensive operation; and
- computer program code for canceling the power intensive operation when the battery level is not adequate to complete the power intensive operation.

15. The computer program product as recited in claim 11, further comprising:
- after canceling the power intensive operation and when the portable electronic device is connected to the external power source;
- computer program code for charging the battery from the external power source to the second threshold; and
- computer program code for re-initiating from the beginning execution of the power intensive operation.

* * * * *